United States Patent
Shim

(10) Patent No.: US 10,963,209 B2
(45) Date of Patent: Mar. 30, 2021

(54) METHOD AND APPARATUS FOR ARRANGING A PLURALITY OF ICONS ON A SCREEN

(71) Applicant: Samsung Electronics Co., Ltd., Suwon-si (KR)

(72) Inventor: Hyo-sun Shim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/777,605

(22) Filed: Jan. 30, 2020

(65) Prior Publication Data

US 2020/0167121 A1    May 28, 2020

Related U.S. Application Data

(63) Continuation of application No. 14/159,952, filed on Jan. 21, 2014, now abandoned.

(30) Foreign Application Priority Data

Jan. 21, 2013 (KR) .................. 10-2013-0006287

(51) Int. Cl.
| | | |
|---|---|---|
| G06F 3/14 | (2006.01) | |
| H04L 29/08 | (2006.01) | |
| G06F 3/0482 | (2013.01) | |
| G06F 3/0481 | (2013.01) | |
| G06F 3/0483 | (2013.01) | |

(Continued)

(52) U.S. Cl.
CPC .......... *G06F 3/1454* (2013.01); *G06F 3/0482* (2013.01); *G06F 3/0483* (2013.01); *G06F 3/04817* (2013.01); *G06F 9/451* (2018.02); *G06F 9/452* (2018.02); *H04L 67/02* (2013.01); *H04L 67/30* (2013.01); *H04L 67/306* (2013.01); *G09G 5/14* (2013.01); *G09G 2354/00* (2013.01); *G09G 2370/042* (2013.01)

(58) Field of Classification Search
None
See application file for complete search history.

(56) References Cited

U.S. PATENT DOCUMENTS 5,666,501 A * 9/1997 Jones ..................... G06F 8/61
                                                709/222
5,737,557 A    4/1998 Sullivan
(Continued)

FOREIGN PATENT DOCUMENTS

| AU | 2011367233 | 11/2013 |
|---|---|---|
| CN | 102811271 | 12/2012 |

(Continued)

OTHER PUBLICATIONS

"SyncML Sync Protocol, version 1.1," Feb. 15, 2002, http://technical.openmobilealliance.org/tech/affiliates/syncml/syncml_sync_protocol_v11_20020215.pdf.

(Continued)

*Primary Examiner* — Ryan Barrett
(74) *Attorney, Agent, or Firm* — Nixon & Vanderhye, P.C.

(57) ABSTRACT

A method and apparatus are provided for arranging icons on a screen of a device, wherein a first device receives information about a layout of a plurality of icons displayed on a screen of a second device, and then displays the plurality of icons on a screen of the first device, based on the received information.

15 Claims, 14 Drawing Sheets

(51) Int. Cl.
*G06F 9/451* (2018.01)
*G09G 5/14* (2006.01)

(56) References Cited

U.S. PATENT DOCUMENTS

| | | | |
|---|---|---|---|
| 5,742,286 | A | 4/1998 | Kung |
| 5,841,435 | A | 11/1998 | Dauerer |
| 6,300,947 | B1 | 10/2001 | Kanevsky |
| 6,522,347 | B1 | 2/2003 | Tsuji et al. |
| 6,621,508 | B1 | 9/2003 | Shiraishi |
| 7,073,137 | B2 | 7/2006 | Hassanin et al. |
| 7,698,660 | B2 | 4/2010 | Sanchez et al. |
| 8,479,102 | B2 | 7/2013 | Son et al. |
| 8,521,146 | B2 | 8/2013 | Lee et al. |
| 9,071,615 | B2 | 6/2015 | Sanchez et al. |
| 9,092,108 | B2 | 7/2015 | Son et al. |
| 9,294,606 | B2 | 3/2016 | Zhou |
| 2003/0025735 | A1 | 2/2003 | Polgar |
| 2003/0025738 | A1 | 2/2003 | Polgar |
| 2003/0067489 | A1 | 4/2003 | Wong et al. |
| 2003/0070061 | A1 | 4/2003 | Wong et al. |
| 2003/0189597 | A1 | 10/2003 | Anderson |
| 2003/0222917 | A1 | 12/2003 | Trantow |
| 2004/0263515 | A1 | 12/2004 | Balsiger |
| 2005/0168399 | A1 | 8/2005 | Palmquist |
| 2006/0150120 | A1 | 7/2006 | Dresti |
| 2006/0230342 | A1 | 10/2006 | Nelson |
| 2006/0277469 | A1 | 12/2006 | Chaudhri |
| 2007/0101297 | A1 | 5/2007 | Forstall |
| 2007/0124737 | A1 | 5/2007 | Wensley |
| 2007/0130541 | A1 | 6/2007 | Louch et al. |
| 2007/0266335 | A1 | 11/2007 | Zielinski |
| 2007/0271522 | A1 | 11/2007 | Son |
| 2008/0114844 | A1 | 5/2008 | Sanchez et al. |
| 2008/0120439 | A1 | 5/2008 | Kwan et al. |
| 2008/0248834 | A1 | 10/2008 | Chatterjee |
| 2009/0241104 | A1 | 9/2009 | Amiga |
| 2009/0282352 | A1 | 11/2009 | Solanki |
| 2009/0299960 | A1 | 12/2009 | Lineberger |
| 2009/0307626 | A1 | 12/2009 | Jalon |
| 2010/0050111 | A1 | 2/2010 | Duffy |
| 2010/0053164 | A1 | 3/2010 | Imai |
| 2010/0070931 | A1 | 3/2010 | Nichols |
| 2010/0077347 | A1 | 3/2010 | Kirtane |
| 2010/0088634 | A1 | 4/2010 | Tsuruta |
| 2010/0095217 | A1 | 4/2010 | Kang |
| 2010/0153857 | A1 | 6/2010 | Sanchez et al. |
| 2010/0180209 | A1* | 7/2010 | Yang ............ G06F 3/0683 715/748 |
| 2010/0211886 | A1* | 8/2010 | Forstall .......... G06F 3/04817 715/745 |
| 2010/0223563 | A1* | 9/2010 | Green ............ G06F 3/0484 715/762 |
| 2010/0262953 | A1* | 10/2010 | Barboni .......... G06F 8/64 717/120 |
| 2010/0271288 | A1* | 10/2010 | Srinivasan ...... G06F 3/1454 345/2.2 |
| 2010/0295789 | A1* | 11/2010 | Shin ............... G06F 3/04847 345/168 |
| 2010/0313136 | A1* | 12/2010 | Yoshizawa ...... H04N 21/472 715/739 |
| 2011/0055765 | A1* | 3/2011 | Neubrand ........ H04N 1/32122 715/838 |
| 2011/0061010 | A1* | 3/2011 | Wasko ............ G06F 3/0482 715/769 |
| 2011/0082938 | A1* | 4/2011 | Jaudon ............ G06F 9/451 709/227 |
| 2011/0219225 | A1* | 9/2011 | Yamazaki ........ G06F 1/24 713/100 |
| 2011/0219331 | A1* | 9/2011 | DeLuca .......... G06F 3/048 715/799 |
| 2011/0225544 | A1 | 9/2011 | Demar |
| 2011/0271226 | A1 | 11/2011 | Janssen et al. |
| 2012/0017147 | A1 | 1/2012 | Mark |
| 2012/0023157 | A1 | 1/2012 | Roth et al. |
| 2012/0060109 | A1 | 3/2012 | Han |
| 2012/0066622 | A1 | 3/2012 | Park |
| 2012/0088548 | A1 | 4/2012 | Yun |
| 2012/0151403 | A1 | 6/2012 | Bhogal |
| 2012/0203862 | A1 | 8/2012 | Tayeb |
| 2012/0226985 | A1 | 9/2012 | Chervets |
| 2012/0309463 | A1 | 12/2012 | Lee et al. |
| 2013/0005488 | A1 | 1/2013 | Evans |
| 2013/0084828 | A1 | 4/2013 | Forte |
| 2013/0097516 | A1 | 4/2013 | Hong |
| 2013/0125009 | A1 | 5/2013 | DeLuca |
| 2013/0139109 | A1 | 5/2013 | Kim |
| 2013/0151983 | A1* | 6/2013 | Lovitt ............ G06F 9/451 715/745 |
| 2013/0159872 | A1* | 6/2013 | Son ............... G06F 9/44505 715/744 |
| 2013/0187866 | A1* | 7/2013 | Kim .............. G06F 3/0481 345/173 |
| 2013/0275553 | A1 | 10/2013 | Shilo |
| 2013/0321340 | A1 | 12/2013 | Seo |
| 2014/0040797 | A1 | 2/2014 | Qian |
| 2014/0075377 | A1 | 3/2014 | Kang |
| 2014/0189527 | A1 | 7/2014 | Kruglick |
| 2014/0189549 | A1 | 7/2014 | Shuttleworth et al. |
| 2014/0201803 | A1 | 7/2014 | Patil |
| 2014/0203999 | A1 | 7/2014 | Shim |
| 2014/0298108 | A1 | 10/2014 | Cui |
| 2014/0359602 | A1 | 12/2014 | Sawaya |
| 2015/0256574 | A1 | 9/2015 | Sanchez et al. |
| 2015/0331602 | A1 | 11/2015 | Son et al. |
| 2015/0355816 | A1 | 12/2015 | Shim |
| 2016/0188280 | A1 | 6/2016 | Shim |
| 2020/0167121 | A1* | 5/2020 | Shim ............. H04L 67/306 |

FOREIGN PATENT DOCUMENTS

| | | |
|---|---|---|
| EP | 1777611 | 4/2007 |
| GB | 2480825 | 7/2011 |
| JP | 2005-094334 | 4/2005 |
| JP | 2007-317187 | 12/2007 |
| JP | 2014-134911 | 7/2014 |
| KR | 10-1171917 | 8/2012 |
| KR | 2012-0091595 | 8/2012 |
| RU | 2 458 388 | 8/2012 |
| WO | 2010/120899 | 10/2010 |
| WO | 2012/150963 | 11/2012 |

OTHER PUBLICATIONS

International Search Report dated May 8, 2014 in corresponding International Patent Application No. PCT/KR2014/000599.
Communication of Acceptance dated Jan. 29, 2016 in corresponding Finnish Application No. 20155571.
Text Intended for Grant in corresponding Finnish Application No. 20155571.
Search Report dated Jan. 29, 2016 in corresponding Finnish Application No. 20155571.
Notice of Preliminary Rejection dated Jun. 27, 2016 in counterpart Japanese Patent Application No. 2015-553663 and English-language translation thereof.
Office Action dated Jul. 6, 2016 in counterpart Canadian Patent Application No. 2,898,727.
Extended Search Report dated Jul. 27, 2016 in counterpart European Application No. 14740875.1.
Office Action dated Aug. 1, 2016 in counterpart Mexican Patent Application No. 2015009355 and English-language translation thereof.
Office Action dated Sep. 27, 2016 in U.S. Appl. No. 14/827,010.
Notice of Allowance dated Oct. 17, 2016 in counterpart Japanese Patent Application No. 2015-553663 and English-language translation thereof.
Notice of Preliminary Rejection dated Dec. 5, 2016 in counterpart Korean Patent Application No. 10-2013-0006287 and English-language translation thereof.
Office Action dated Apr. 10, 2017 in counterpart Canadian Patent Application No. 2898727.

(56) References Cited

OTHER PUBLICATIONS

Office Action dated Apr. 13, 2017 in U.S. Appl. No. 14/827,010.
Examiner's Answer dated Apr. 21, 2017 in U.S. Appl. No. 15/060,344.
Office Action dated Dec. 1, 2017 in counterpart Chinese Patent Application No. 201480005529.0 and English-language translation.
Examination Report dated Dec. 14, 2017 in European Patent Application No. 14740875.1.
Office Action dated Dec. 26, 2017 in Russian Patent Application No. 2015135376 and English-language translation.
Office Action dated Jan. 8, 2018 in U.S. Appl. No. 15/060,344.
Office Action dated Jan. 9, 2018 in U.S. Appl. No. 14/827,010.
Summons to attend oral proceedings mailed Jun. 5, 2018 in counterpart European Patent Application No. 14740875.1.
Office Action dated Jun. 25, 2018 in counterpart Chinese Patent Application No. 201480005529.0 and English-language translation thereof.
Final Office Action dated Jun. 29, 2018 in U.S. Appl. No. 14/827,010.
Final Office Action dated Jun. 29, 2018 in U.S. Appl. No. 15/060,344.
Examination Report dated Aug. 31, 2018 in counterpart Australian Patent Application No. 2014207942.
Final Office Action dated Sep. 10, 2018 in U.S. Appl. No. 14/827,010.
Result of consultation mailed Sep. 19, 2018 in counterpart European Patent Application No. 14740875.1.
Office Action dated Dec. 7, 2018 in U.S. Appl. No. 14/827,010.
Office Action dated Dec. 10, 2018 in U.S. Appl. No. 15/060,344.
Examination Report dated Dec. 14, 2018 in Australian Patent Application No. 2014207942.
Office Action dated Jan. 2, 2019 in Chinese Patent Application No. 201480005529.0 and English-language translation.
Webdesigner Depot, "The Myth of DPI," Feb. 15, 2010, 14 pages, https://www.webdesignerdepot.com/2010/02/the-myth-of-dpi/.
Curtin, "Sensors, Pixels and Image Sizes," 2011, 3 pages, http://www.shortcourses.com/sensors/sensors1-11.html.
Examination Report No. 3 dated Mar. 12, 2019 in Australian Patent Application No. 2014207942.
Final Office Action dated May 1, 2019 in U.S. Appl. No. 15/060,344.
Final Office Action dated May 2, 2019 in U.S. Appl. No. 14/827,010.
Rejection Decision dated May 22, 2019 for Chinese Patent Application No. 201480005529.0 and English-language translation of same.
Office Action dated Feb. 17, 2020 in counterpart Brazilian Patent Application No. BR112015017181-8.
Android Developers, "Supporting Multiple Screens", Nov. 2, 2010, https://web.archive.org/web/20101102082327/http://developer.android.com/guide/practices/screens_support.html.
Shim, U.S. Appl. No. 14/159,952, filed Jan. 21, 2014.
Shim, U.S. Appl. No. 15/060,344, filed Mar. 3, 2016.
Shim, U.S. Appl. No. 14/827,010, filed Aug. 14, 2015.
Reexamination Notification dated Aug. 4, 2020 in counterpart Chinese Patent Application No. 201480005529.0 and English-language translation.
Examination Report dated Sep. 9, 2020 in counterpart Indian Patent Application No. 2576/KOLNP/2015 and English-language translation.
Reexamination Notification dated Jan. 25, 2021 in counterpart Chinese Patent Application No. 201480005529.0 and English-language translation.

* cited by examiner

METHOD AND APPARATUS FOR ARRANGING A PLURALITY OF ICONS ON A SCREEN

CROSS-REFERENCE TO RELATED APPLICATIONS

This application is a continuation of U.S. application Ser. No. 14/159,952, filed Jan. 21, 2014, which claims priority under 35 U.S.C. § 119(a) to Korean Patent Application No. 10-2013-0006287, which was filed in the Korean Intellectual Property Office on Jan. 21, 2013. The disclosures of each of these applications are incorporated by reference herein in their entireties.

BACKGROUND

1. Field

The present invention relates generally to displaying icons on a screen of a device, and more particularly, to a method and apparatus for arranging a plurality of icons included in a plurality of pages on a screen of a device.

2. Description of Related Art

As users upgrade or purchase additional electronic devices, it is common to install the same applications that were installed on their previous devices on their new devices.

Conventionally, a list of applications installed on the previous device is provided on a screen of a new device to help a user to install the previous applications of the old device on a new device with ease. However, the new device will only install the applications selected by the user from the application list, but will not consider how icons corresponding to these installed applications should be arranged on a screen of the new device.

SUMMARY

Accordingly, the present invention is designed to address at least the problems and/or disadvantages described above and to provide at least the advantages described below.

Accordingly, an aspect of the present invention is to provide a method and an apparatus for arranging icons on a screen of a device.

Another aspect of the present invention is to provide a method and an apparatus for arranging icons corresponding to applications of a first device on a screen of a second device, when a user installs the application of the first device onto the second device.

In accordance with an aspect of the present invention, a method for displaying, by a first device, on a screen thereof, a plurality of icons corresponding to a plurality of applications installed on a second device, which is separate from the first device, is provided. The method includes receiving, by the first device, information about a layout of the plurality of icons displayed on a screen of the second device; for displaying the plurality of icons corresponding to the plurality of applications on the screen of the first device, based the received information; and displaying the plurality of icons on the screen of the first device according to the determined layout.

In accordance with another aspect of the present invention, a method for displaying, on a screen of a first device, a plurality of icons corresponding to a plurality of applications installed on a second device, which is separate from the first device, is provided. The method includes displaying, by the second device, the plurality of icons corresponding to the plurality of applications on a screen of the second device; transmitting, by the second device, information about a layout of the plurality of icons displayed on the screen of the second device, to the first device or a server; receiving, by the first device, the information about the layout of the plurality of icons, from the second device or the server; determining, by the first device, a layout of the plurality of icons to be displayed on the screen of the first device, based on the received information; and displaying the plurality of icons on the screen of the first device according to the determined layout.

In accordance with another aspect of the present invention, a method for displaying a plurality of icons corresponding to a plurality of applications on a screen of a first device is provided. The method includes receiving, by the first device, information about a layout of the plurality of icons; determining a layout of the plurality of icons corresponding to the plurality of applications to be displayed on the screen of the first device, based on the received information; and displaying the plurality of icons on the screen of the first device according to the determined layout.

In accordance with another aspect of the present invention, a first device is provided for displaying a plurality of icons on a screen thereof, the plurality of icons corresponding to a plurality of applications installed on a second device, which is separate from the first device. The first device includes a controller configured to receive information about a layout of the plurality of icons displayed on a screen of the second device, and to determine a layout of the plurality of icons corresponding to the plurality of applications to be displayed on the screen of the first device, based on the received information; and a display configured to display the plurality of icons on the screen according to the determined layout.

In accordance with another aspect of the present invention, a system for displaying a plurality of icons is provided. The system includes a second device; and a first device configured to display, on a screen thereof, a plurality of icons corresponding to a plurality of applications installed on the second device. The second device transmits information about a layout of the plurality of icons displayed on a screen of the second device, to the first device or a server, and the first device receives the information about the layout of the plurality of icons from the second device or the server, determines a layout of the plurality of icons to be displayed on the screen of the first device, based on the received information, and displays the plurality of icons on the screen of the first device according to the determined layout.

In accordance with another aspect of the present invention, a device is provided for displaying a plurality of icons corresponding to a plurality of applications on a screen thereof. The device includes a controller configured to receive information about a layout of the plurality of icons, and to determine the layout of the plurality of icons to be displayed on the screen of the device, based on the received information; and a display configured to display the plurality of icons on the screen of the device according to the determined layout.

BRIEF DESCRIPTION OF THE DRAWINGS

The above and/or other aspects, features, and advantages of the present invention will be more apparent from the following detailed description taken in conjunction with the accompanying drawings, in which.

DETAILED DESCRIPTION OF EXAMPLE EMBODIMENTS

Various embodiments of the present invention will now be described in detail with reference to the accompanying drawings. In the following description, specific details such as detailed configurations and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
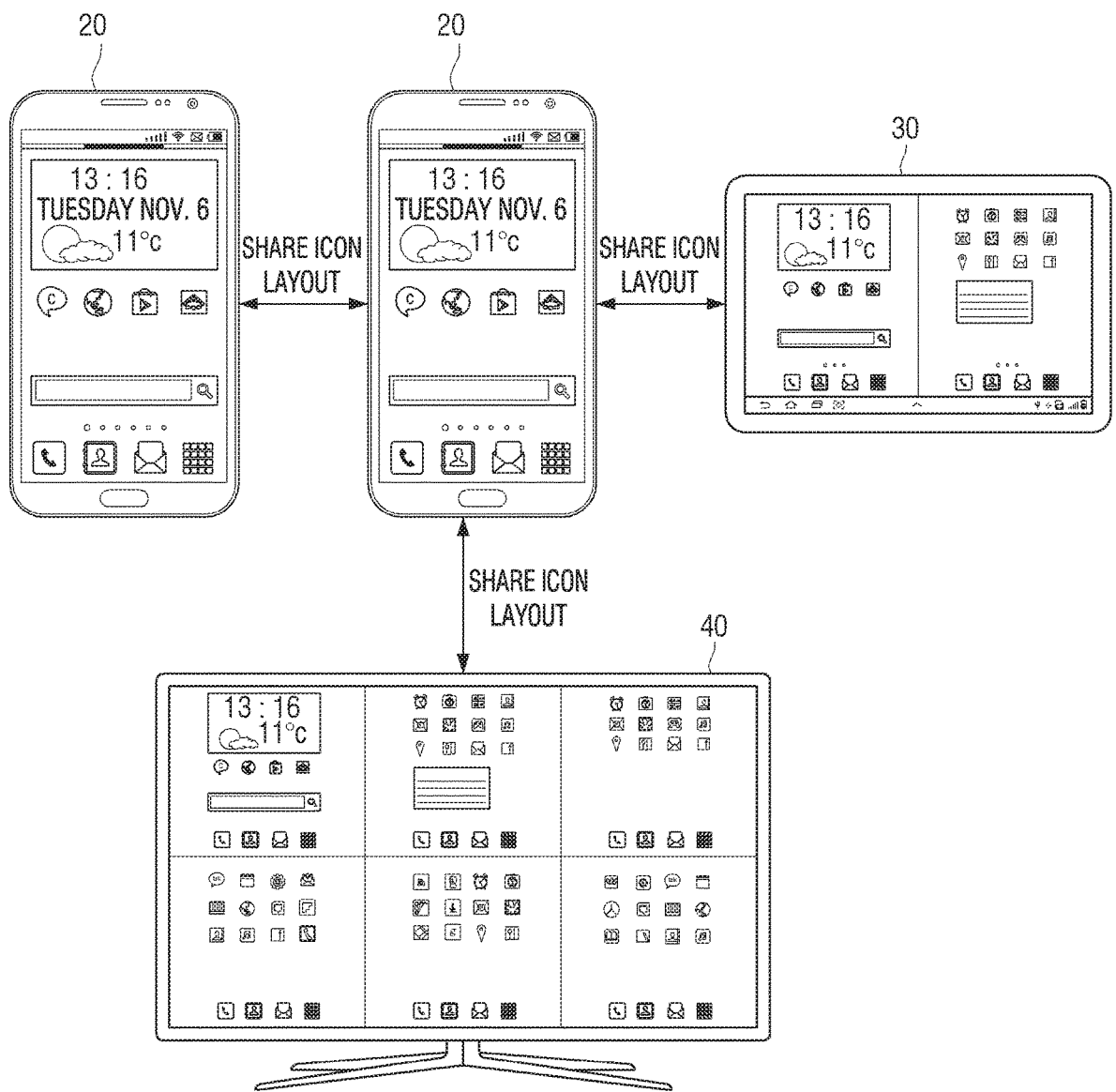
FIG. 1 illustrates an example of sharing a layout of icons among devices according to an embodiment of the present invention.

FIG. 1 illustrates an example of sharing a layout of icons among devices according to an embodiment of the present invention.

Referring to FIG. 1, devices 10, 20, 30, and 40 share a layout of icons on their respective screens with the other devices. For example, device 10 may receive information about the layout of the icons from devices 20, 30, and 40 or transmit information about the layout of the icons to the devices 20, 30, and 40.

Sizes, resolutions, Pixel Per Inch (PPI), or size (width×height) of the cells where the icons are arranged, may be identical or different. For example, in FIG. 1, device 10 and device 20 have a 4.8 inch size, a 720×1280 resolution, a 240 PPI, and a 4×5 cell size. Device 30 has a 10.1 inch size, a 1280×800 resolution, a 149 PPI, and an 8×5 cell size. Device 40 has a 46 inch size, a 3940×2160 resolution, a 96 PPI, and an 8×15 cell size. In FIG. 1, devices 10 and 20 are smartphone, device 30 is a tablet device, and device 40 is a digital TeleVision (TV).

In the embodiments of the invention described below, "the first device" is the device that receives information about a layout of icons from another device, i.e., "the second device". Further, while the first and second devices may be any of devices 10, 20, 30, and 40, as illustrated in FIG. 1, for the convenience of explanation, the embodiments will be described using device 10 as the first device and device 20 as the second device.

Figure 2A:
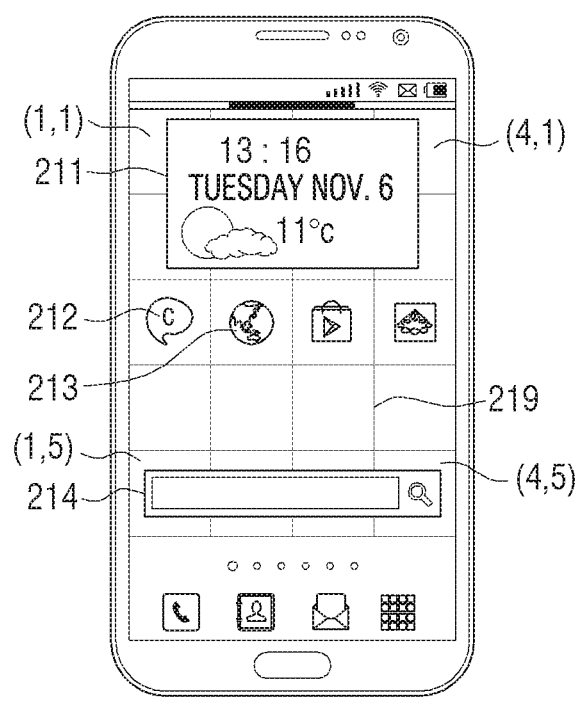
FIGS. 2A to 2C illustrate layouts of icons on a screen of a device, according to an embodiment of the present invention.
Figure 2B:
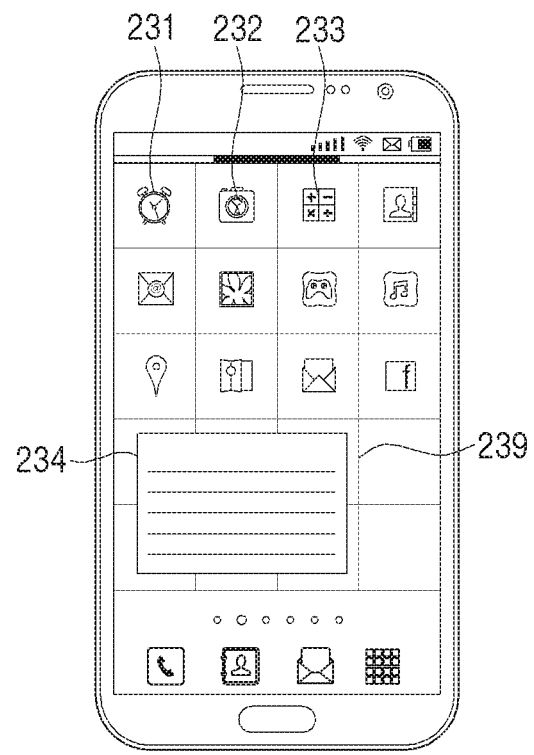
Figure 2C:
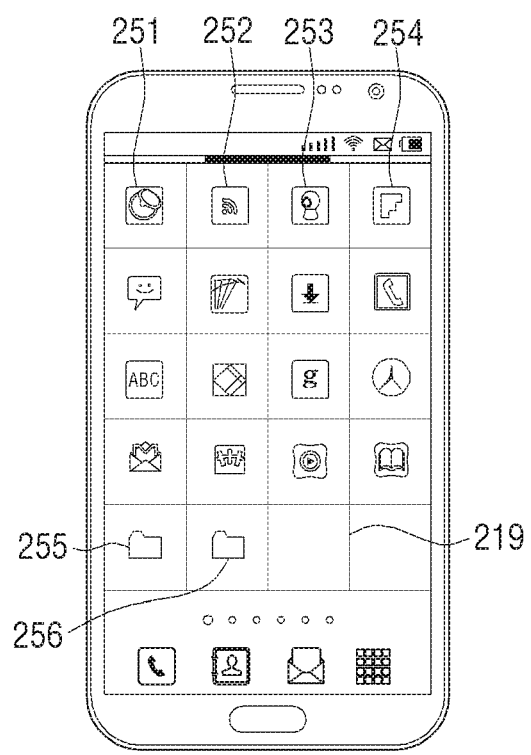

FIGS. 2A to 2C illustrate layouts of icons on a screen of a device, according to an embodiment of the present invention.

Referring to FIGS. 2A to 2C, a plurality of icons are arranged and displayed on screens of the first and second devices 10 and 20. Additionally, the first or second device 10 or 20 may selectively provide one of a plurality of pages, e.g., in response to a gesture made by a user. Thereafter, icons included in the selected page are displayed on the screen. Each page may include a plurality of cells and the icons may be displayed on one or more of the plurality of cells.

More specifically, FIG. 2A illustrates a layout of icons on a first page of a home screen of the first or second device 10 or 20. The plurality of icons are arranged within a 4×5 (width×height) cell area 219. As an example, the icons on the screen in FIG. 2A include a weather widget icon 211 for a weather application, a search widget icon 214 for a search application, shortcuts icons 212 and 213 for executing other specific applications, etc.

FIG. 2B illustrates a layout of icons on a second page of a home screen of the first or second device 10 or 20. Again, a plurality of icons are arranged within a 4×5 (width×height) cell area 219. As an example, the icons in FIG. 2B include a memo widget icon 234 for a memo application, shortcut icons 231, 232, and 233 for executing other specific applications, etc.

For example, information about a layout of the plurality of icons on the screen of the first or second device 10 or 20, as illustrated in FIGS. 2A and 2B, may be stored in a Favorite table of Launcher.db, which is accessed when a Launcher program is executed on the first or second device 10 or 20. A Launcher program is a software program which emphasizes a user interface function on a certain function so as to reduce inconvenience of a user in executing the corresponding function.

For example, the stored information about the layout includes at least one of page information that indicates a position at which an icon is placed, identification information of an application corresponding to the icon, icon type information that indicates the type of icons, e.g., app/shortcut/folder/widget, coordinates (X, Y) of the icon as arranged on a cell area, a cell area size (width×height) on which the icon is displayed, and widget identification information that identifies a widget, when there are a plurality of widgets corresponding to an application.

The Launcher program may obtain information about an icon layout when a terminal boots up. Alternatively, when a user tries to change the icon layout, the package manager may detect the change and provide information such as ACTION_PACKAGE_ADDED, ACTION_PACKAGE_CHANGED, or ACTION_PACKAGE_REMOVED to the Launcher program. The Launcher program then updates stored information about the icon layout in the Launcher.db, using the provided information.

The information about the layouts of the icons displayed on the screens of the first or second device 10 or 20, as illustrated in FIGS. 2A and 2B, may be tabulated as shown in Table 1. In Table 1, the Coordinates, e.g., (1,1), (1,3), etc., correspond to a specific cell in the 4×5 (width×height) cell area 219.

TABLE 1

| Icon | Page info. | Icon type | Coordinates | Size | Application Identification |
|---|---|---|---|---|---|
| Icon (211) | 1 page | Widget | (1, 1) | 4 × 2 | Weather application |
| Icon (212) | 1 page | Shortcut | (1, 3) | 1 × 1 | chatting application |
| Icon (213) | 1 page | Shortcut | (2, 3) | 1 × 1 | Internet application |
| Icon (214) | 1 page | Widget | (1, 5) | 4 × 1 | Search application |
| Icon (231) | 3 pages | Shortcut | (1, 1) | 1 × 1 | Alarm application |
| Icon (232) | 3 pages | Shortcut | (2, 1) | 1 × 1 | Camera application |
| Icon (233) | 3 pages | Shortcut | (3, 1) | 1 × 1 | Calculator Application |
| Icon (234) | 3 pages | Widget | (1, 4) | 3 × 2 | Memo application |

FIG. 2C illustrates a layout of icons on a first page of an application list screen, of the first or second device 10 or 20. The plurality of icons are arranged within a 4×5 (width× height) cell area 219. The icons in FIG. 2C include shortcut icons 251, 252, 253, and 254 for executing different applications, folder icons 255 and 256, which include a plurality of icons, etc. The information about the layout of the plurality of icons may include information about an order in which the icons are arranged. For example, icons 251, 252, 253, and 254 may include information about their respective order, such as being the first, second, third, and fourth icon, respectively.

The above-described layouts and layout information may be equally or similarly implemented in accordance with different examples, e.g., when the first or second device 10 or 20 is a digital TV, a Personal Computer (PC), a tablet device, etc., instead of a smartphone.

Arrangement of the icons on the screen of the first or second device 10 or 20 may be changed by another device that generates icons, deletes icons, moves icons, adjusts size of icons, or forms a folder of a plurality of icons, or in accordance with a user manipulation. Additionally, the information about the layout of the icons may include a history of such changes to the icons.

Further, the information about the layout of the icons may include an install status of the applications corresponding to the icons. For example, the install status of an application corresponding to an icon may include information indicating if the application is installed on the first or second device 10 or 20, if the application is not installed on the first or second device 10 or 20 but is installable upon a user selection of an icon, or if the application is not installable on the first or second device 10 or 20.

Figure 3:
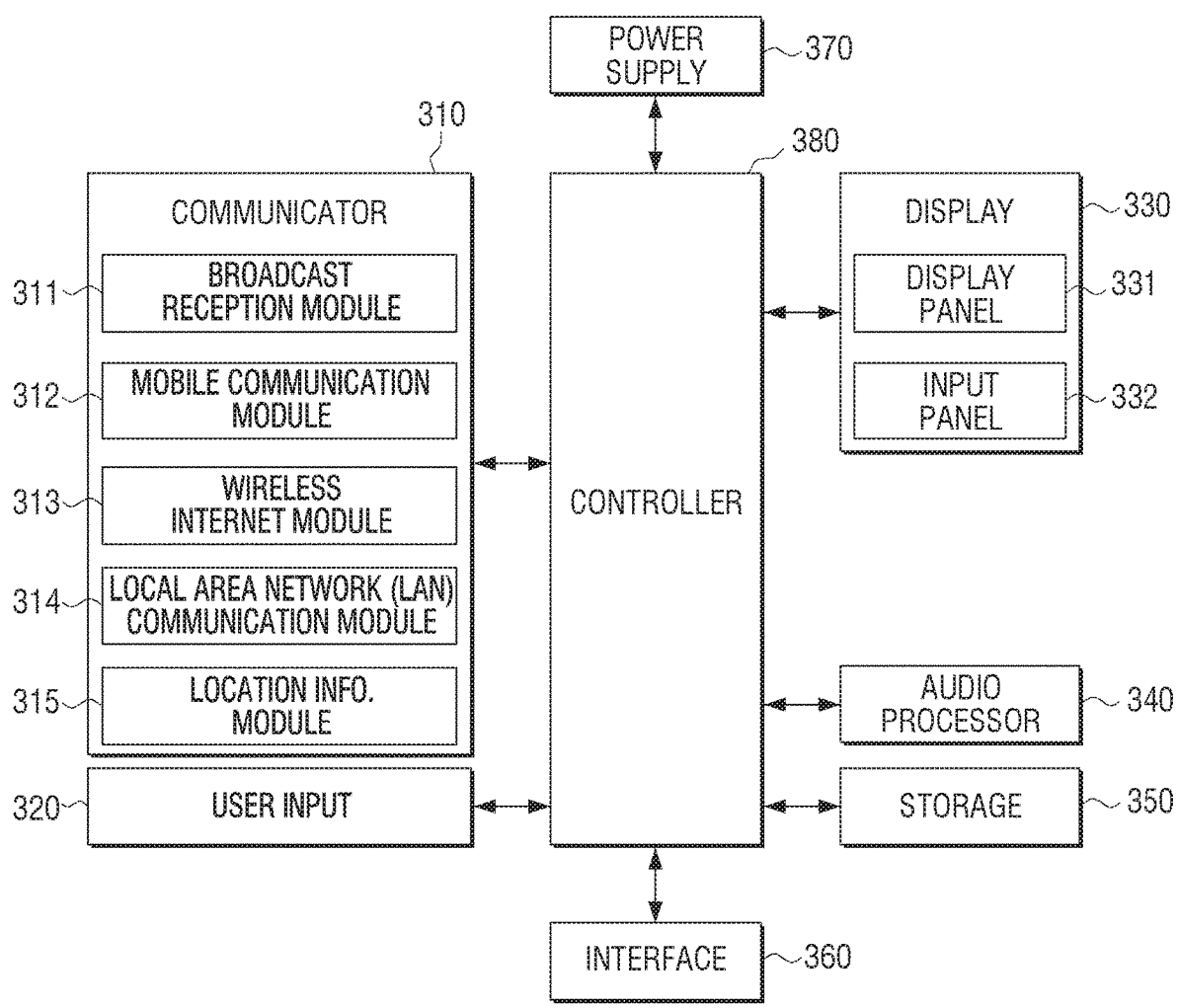
FIG. 3 is a block diagram illustrating an electronic device according to an embodiment of the present invention.

FIG. 3 is a block diagram illustrating an electronic device according to an embodiment of the present invention.

Referring to FIG. 3, the electronic device, e.g., the first device 10, includes a communicator 310, a user input device 320, a display 330, an audio processor 340, a storage 350, an interface 360, a power supply 370, and a controller 380, e.g., a hardware processor. The elements illustrated in FIG. 3 are not necessarily essential, and the device may include more or less elements than actually illustrated in FIG. 3.

The communicator 310 includes modules that communicate with the other devices, e.g., devices 20, 30, and 40, communicate with a network where other devices are located, and communicate with an external server (not illustrated). For example, in FIG. 1, he communicator 310 includes a broadcast receiver module 311, a mobile communication module 312, a wireless internet module 313, a short-range communication module 314, and a location information module 315.

The broadcast receiver module 311 receives a broadcast signal and/or broadcast-related information from an external broadcast management server via a broadcast channel. The broadcast channel may include a satellite channel and a terrestrial broadcasting channel. The broadcast management server may generate a broadcast signal and/or broadcast-related information and send out the same, or receive previously generated broadcast signal and/or broadcast-related information and send out the same to a terminal. The broadcast signal may include not only a TV broadcast signal, a radio broadcast signal and a data broadcast signal, but also a combined form of broadcast signal including a TV broadcast signal or a radio broadcast signal combined with a data broadcast signal. The broadcast-related information may be about a broadcast channel, a broadcast program or a broadcast service provider. The broadcast-related information may also be provided via a mobile communication network, in which case the signal may be received by the mobile communication module 312. The broadcast-related information may be provided in various forms. For example, the broadcast-related information may be provided in the format such as electronic program guide (EPG) of digital multimedia broadcasting (DMB), or electronic service guide (ESG) of digital video broadcast-handheld (DVB-H). The broadcast receiver module 311 receives a broadcast signal using various broadcast system including, for example, Digital Multimedia Broadcasting-Terrestrial (DMB-T), Digital Multimedia Broadcasting-Satellite (DMB-S), Media Forward Only (MediaFLO), Digital Video Broadcast-Handheld (DVB-H), or Integrated Services Digital Broadcast-Terrestrial (ISDB-T). Of course, the broadcast receiver module 311 may be configured to suit the broadcast systems other than the digital broadcast systems explained above, as long as the broadcast systems provide broadcast signals. The broadcast signal and/or the broadcast-related information received via the broadcast receiver module 311 may be stored at the storage 350.

The mobile communication module 312 transmits and receives wireless signals to and from at least one of a base station, an external terminal, and a server. The wireless signal may include various forms of data according to transmission and reception of an audio call signal, a video call signal or a text/multimedia message.

The wireless internet module 313 connects to a wireless Internet provider, and may be built into the first device 10 or provided as a removable module. The wireless internet technology such as wireless LAN (WLAN) (Wi-Fi), Wireless broadband (Wibro), World Interoperability for Microwave Access (Wimax), or High Speed Downlink Packet Access (HSDPA) may be used.

The short-range communication module 314 performs short-range communication, such as Bluetooth, Radio Frequency IDentification (RFID), Infrared Data Association (IrDA), Ultra WideBand (UWB), or Zigbee.

The location information module 315 checks or obtains a current location of a mobile terminal The location information module 315 may acquire location information using Global Navigation Satellite Systems (GNSS). The GNSS is the term that refers to wireless navigation satellite systems in which a certain type of wireless navigation receivers revolving around the earth send out reference signals to determine their locations on or near the surface of the earth. The GNSS may include a global position system of U.S.A., Galileo of Europe, Global Orbiting Navigation Satellite System (GLONASS) of Russia, COMPASS of China, and Quasi-Zenith Satellite System (QZSS) of Japan.

The user input device 320 generates input data for controlling the device. For example, the user input device 320 includes at least one of a side key, a separately-provided touch pad, a jog wheel, a jog switch, a keypad dome switch, etc. Further, the user input 320 may include a button key to implement turn-on or turn-off of the first device, or a home key which supports return to a base screen as supported by the first device 10. Further, the user input 320 may be part of the constituent elements of a remote controller placed outside the first device 10, in which case the user may control the operation of the first device 10 by manipulating the remote controller.

The display 330 includes a display panel 331 for displaying information processed by the device and an input panel 332 to perform a user input function, e.g., touch screen input operations. The input panel 332 may be implemented as at least one or more panels which can detect various inputs including user's single or multi touches, dragging, jotting, or drawing. Further, the input panel 332 may be implemented as one single panel which can detect both the inputs from a finger and a pen, or as two separate panels including a touch panel (not illustrated) which can detect a finger input and a pen recognition panel (not illustrated) which can detect pen input. For example, the display panel 331 includes a liquid crystal display, a thin film transistor-liquid crystal display, an organic light-emitting diode, a flexible display, or a 3D display. The display panel 331 may display various screens according to various operational status of the first device 10, the application as executed, or services.

The input panel 332 may detect user's touch input. The input panel 332 may detect a touch input and output a touch event value that corresponds to the detected touch signal. The information corresponding to the detected touch signal may be displayed on the display panel 331. The input panel 332 may receive a manipulation signal according to a user's touch input made via a variety of input means. For example, the input panel 332 may be configured based on a capacitive touch panel. When implemented as a capacitive touch panel, the input panel 332 may be constructed so that thin metallic conductive material (e.g., indium tin oxide (ITO) layer) is coated on both surfaces of the glass to allow electric current to flow on the glass surfaces and dielectric substances are coated to store electric charge. Accordingly, in response to touch made on the surface of the input panel 332 by another object, a predetermined electric charge moves to the location of touch, and the input panel 332 detects the location of touch by perceiving variation of electric current according to the movement of the electric charge, and thus traces a touch event. The touch event generated at the input panel 332 may be originated from a finger of a human, or other object such as a conductive object that can make variation in the capacitance.

The audio processor 340 may include at least one of a microphone (not illustrated) to collect an audio signal, and a speaker (not illustrated) to output an audio signal.

The microphone receives an input of an external sound signal in communication mode or recording mode, or voice recognition mode, and processes the input into electric audio data. The processed audio data may be converted into a form that can be sent out to a mobile communication base station via the wireless communication module 312, when the current mode is the communication mode. The microphone may implement various noise-filtering algorithms to remove any noise that can be generated in the process of receiving external sound signal.

The speaker may output the audio data that may be received from the communicator 310 in the event of receiving call signal, or in communication mode or recording mode, voice recognition mode or broadcast reception mode, or audio data stored at the storage 350. Further, the speaker may output audio data via an earphone jack (not illustrated). The user may connect an earphone to the earphone jack and listen to audio as outputted.

The storage 350 stores various programs and data for the operation of the device. For example, the storage 350 stores an operating system, and/or function programs that support screens output on the display 330. Further, the storage 350 may temporarily store the data as inputted and outputted.

The storage 350 may include at least one of a flash memory, a hard disk, a multimedia card, a card memory, a Random Access Memory (RAM), a Static Random Access Memory (SRAM), a Read-Only Memory (ROM), a Programmable ROM (PROM), an Electrically Erasable PROM (EEPROM), a magnetic memory, a magnetic disk, and an optical disk. Additionally, the device may operate in association with a web storage, which performs a storage function of the storage 350, over the Internet.

The interface 360 plays a role of a passage between the first device 10 and all the external devices connected thereto. The interface 360 may receive data or power from an external device and deliver the received data or power to the respective components inside the first device 10, or transmit the data inside the first device 10 to the external device. By way of example, the interface 360 may include a wired/wireless headset port, an external charger port, a wired/wireless data port, a memory card port, a port to connect to a device equipped with identification module, an audio input/output (I/O), a video I/O, or an earphone port. The identification module may be a chip that stores various information to verify right to use the first device 10, and may include user identity module (UIM), subscriber identity module (SIM), or universal subscriber identity module (USIM). The device equipped with the identification module may also be designed to a smart card form. Accordingly, the identification device may be connected to the first device 10 via the port. Meanwhile, when the first device 10 is connected to an external cradle, the interface 360 may play a role of a passage to supply the power from the cradle to the first device 10 or a passage to deliver various command signals inputted by the user to the cradle to the first device 10.

The controller 380 is configured to receive information about a layout from a second device and to display a plurality of icons on the screen of the device. Based on such elements, the controller 380 controls signal and data processing and implementation of the functions to display the plurality of icons. For example, the controller 380 is configured to receive information about a layout displayed on the screen of a second device, determine a layout of displaying a plurality of icons on the screen of the device using the received information about the layout, and display the plurality of icons on the display 330, according to the determined layout.

The power supply 370 receives external and internal power according to the control by the controller 380 and supplies power for operating the respective elements.

Various embodiments may be implemented on a recording medium which is readable by a computer or a similar device, using, for example, software, hardware or a combination of these. The hardware-level implementation may include at least one of Application Specific Integrated Circuits (ASICs), Digital Signal Processors (DSPs), Digital Signal Processing Devices (DSPDs), Programmable Logic Device (PLDs), Field Programmable Gate Arrays (FPGAs), processors, controllers, micro-controllers, microprocessors, or electric unit to perform function. The software-level implementation may include a separate software module which allows implementation or at least one function or operation according to the embodiments. Software code may be implemented by a software application written in proper program language. Further, the software code may be stored in the storage 350 and executed by the controller 380.

Figure 4:
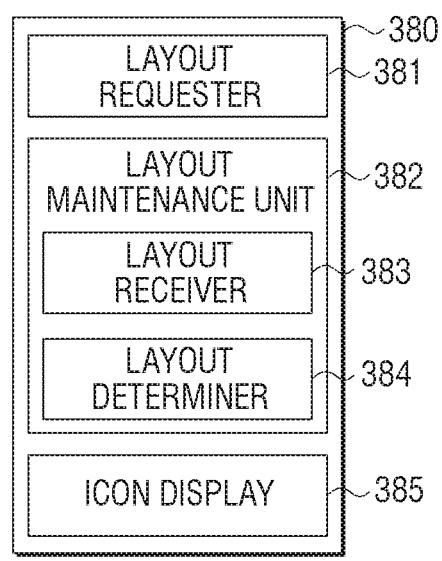
FIG. 4 illustrates function blocks of a controller of a device according to an embodiment of the present invention.

FIG. 4 illustrates function blocks of a controller of a device according to an embodiment of the present invention.

Referring to FIG. 4, the controller 380 includes a layout requester function 381, a layout maintenance function 382, and an icon display function 385.

Using the layout requester function 381, the controller 380 requests information about a layout of icons from a server or a second device. For example, the layout requester function 381 connects the device to the server or the second device via the communicator 310. Further, the layout requester function 381 may initiate a request to log in to the server or the second device, by using user information (e.g., an ID and a password) input from the user or pre-stored user information from the storage 350.

The server may have information about a plurality of layouts corresponding to a plurality of devices, respectively. Accordingly, when the device provides information about the plurality of layouts, the layout requester function 361 may request, from the server, information about a layout that corresponds to a device as selected by the user.

The layout manager function 382 includes a layout receiver function 383 and a layout determiner function 384. The layout receiver function 383 receives information about the layout of the icons displayed on the screen of the second device, from the second device or the server. The layout determiner function 384 may determine a layout of the plurality of icons displayed on the screen of the first device, by using the received layout information.

Using the icon display function 385, the controller 380 displays icons corresponding to a plurality of applications on the display 330 of the device, according to the layout of icons as determined at the layout manager function 382. Further, the icon display function 385 displays the icons on the screen of the device, based on the status of the applications corresponding to the icons. For example, the icon display function 385 may differently display the icons on the screen depending on whether the application corresponding to the icon is installed on the device or not, and whether or not the application is installable or not.

Figure 5:
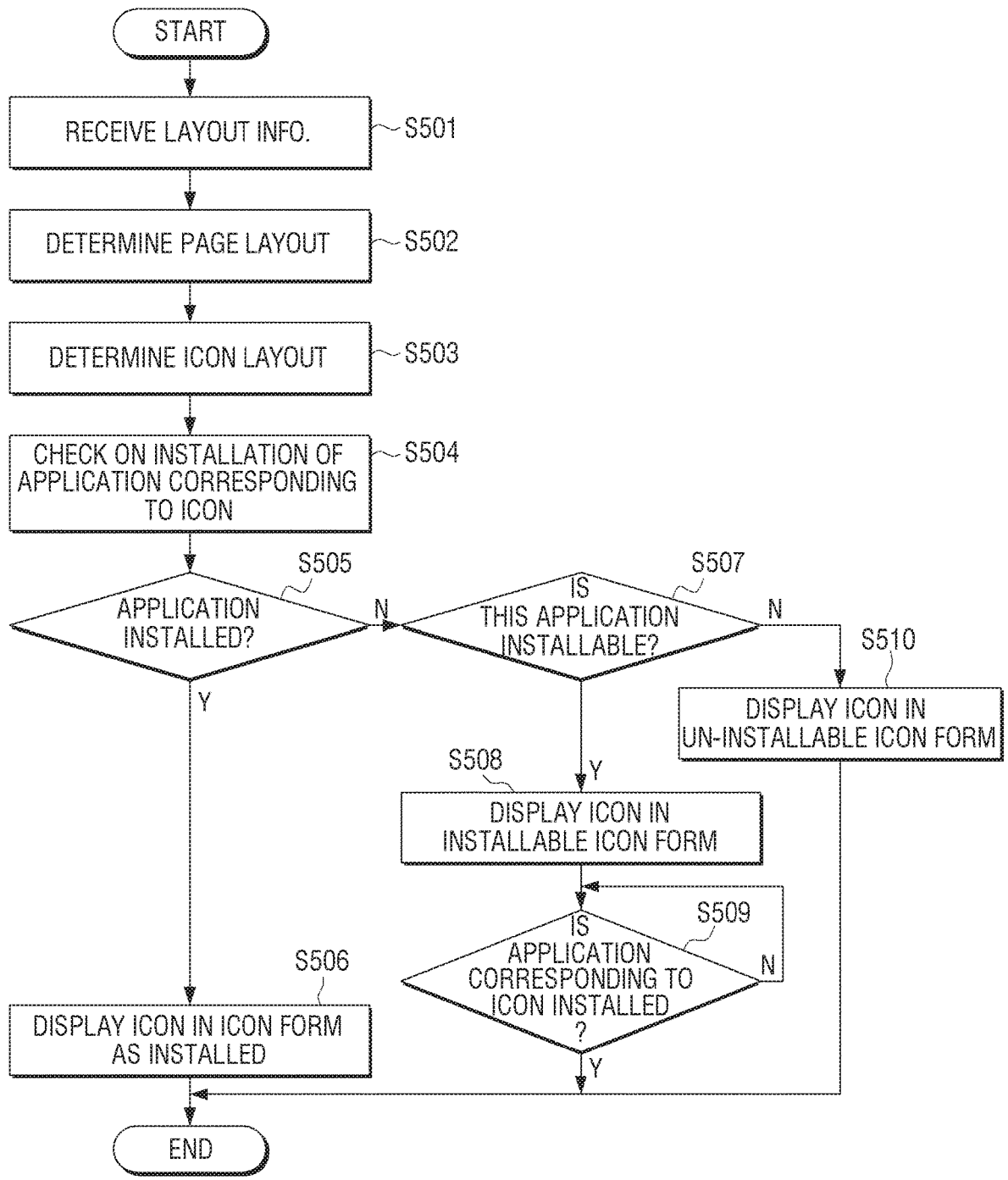
FIG. 5 is a flowchart illustrating an operation of a controller of a device, according to an embodiment of the present invention.

FIG. 5 is a flowchart illustrating an operation of a controller of a device, according to an embodiment of the present invention. Specifically, FIG. 5 illustrates an operation of the controller 380 of the first device 10, which receives layout information of the second device 20.

Referring to FIG. 5, in step S501, the controller 380 receives information about a layout of the icons. For example, as described above, the received layout information includes at least one of the screen size of the second device 20, a resolution, a PPI, and a size of a cell area in which the icons are arranged. Further, the layout information of the icons may include at least one of a total number of pages, page information where the icons are located, identification information of an application corresponding to an icon, icon type information, coordinates of location in the cell area at which the icon is arranged, a size of the cell area, and widget identification information, when there are a plurality of widgets corresponding to an application. Further, the layout information of the icons may include a history of changing icons and install status of an application corresponding to each icon. The layout receiver 383 may deliver the received information about the arrangement to the layout determiner 384.

In step S502, the controller 380 determines a layout of pages including icons displayed on the screen of the first device 10, by using the received layout information. For example, the controller 380 determines a number of pages to be displayed on the screen of the first device 10, based on the screen sizes of the first and second devices 10 and 20.

Further, the controller 380 may consider the PPI used at the first and second devices 10 and 20. For example, when the first device 10 has a screen size of 46 inches, and the second device 20 has a screen size of 4.8 inches, which is approximately one-tenth the size of the first device screen, ten pages of the second device 20 may be displayed on one screen of the first device 10. However, because the first device 10, which has a larger screen than the second device 20, has a less PPI than the second device 20, less than ten pages are displayable on the first device 10. Further, when the first device 10 is a TV, i.e., a device that is usually viewed at a predetermined distance, the number of pages that are actually displayed on the first device 10 may be further decreased to maintain a predetermined viewable size to a user, considering the fact that the icon size decreases as the number of pages increases.

When the number of pages to be displayed on the first device 10 is determined, the controller 380 determines a location to display the pages on the screen of the first device 10. For example, when there are six pages of the second device 20 to be displayed on one page of the first device 10, according to the order of pages, the first to third pages of the second device 20 are placed on an upper portion of the screen of the first device 10, and the fourth to sixth pages of the second device 20 are placed on the lower portion of the screen of the first device 10.

Figure 6:
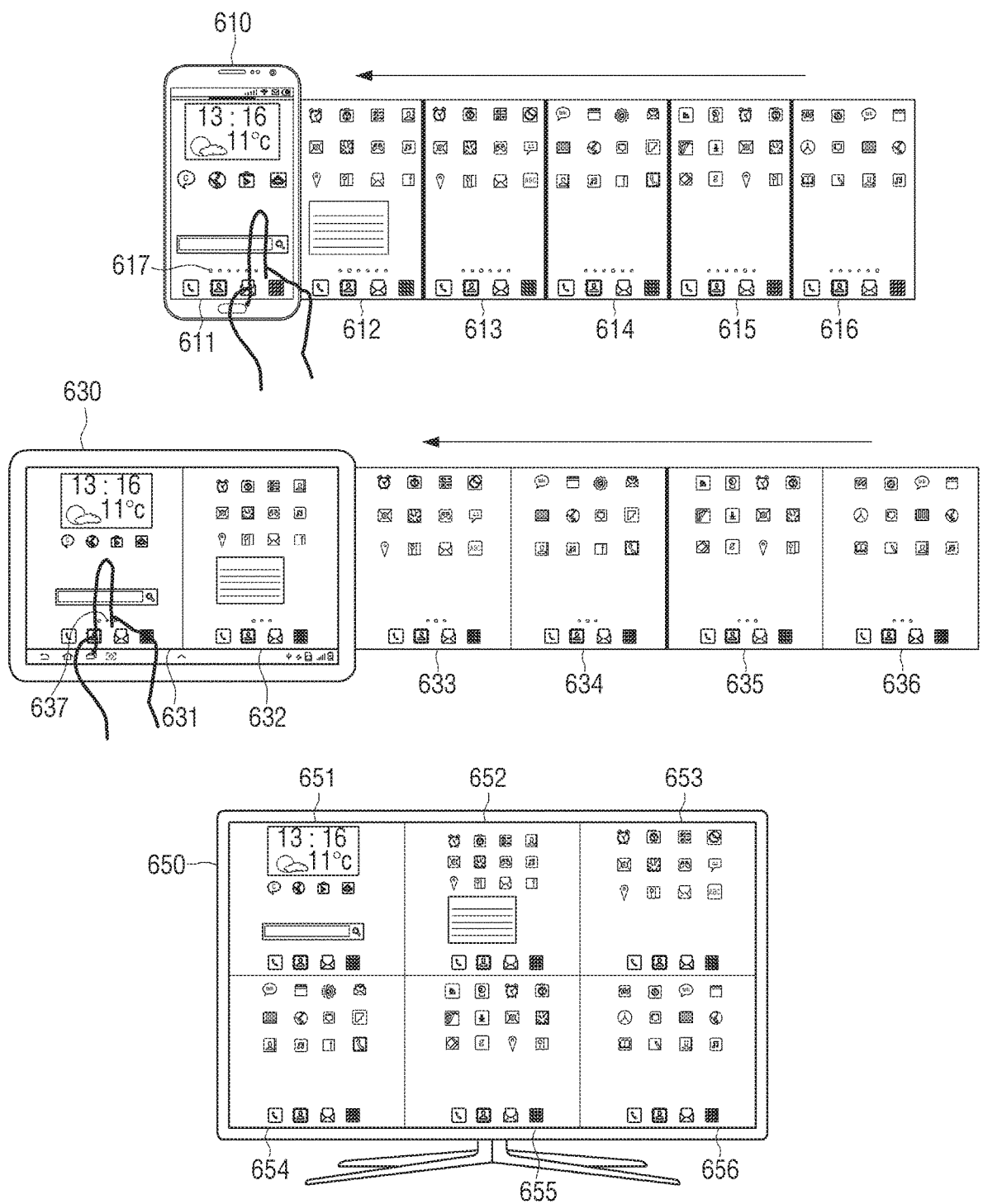
FIG. 6 illustrates screens on which a page layout is shared among devices, according to an embodiment of the present invention.

FIG. 6 illustrates screens on which a page layout is shared among devices, according to an embodiment of the present invention.

Referring to FIG. 6, the devices 610, 630, and 650 have screens of 4.8 inches, 10.1 inches, and 46 inches, respectively. A screen of device 610 displays one page 611. The rest of pages 612, 613, 614, 615, and 616 are displayed in sequence on the screen of device 610, in response to a user swipe gesture.

Pages 631 and 632 correspond to pages 611 and 612, which are selectively displayed on one screen of the device 610, are displayed on one screen of device 630. Pages 633, 634, 635, and 636 of device 630, which correspond to pages 613, 614, 615, and 616 of device 610, are displayed on the screen of device 630 in pairs, in sequence, and in response to a user gesture. Further, all six pages 611, 612, 613, 614, 615, and 616 that are selectively displayed on the device 610 are displayed on one screen of device 650 as pages 651 to 656.

When the number of pages displayable concurrently on one screen varies among the devices 610, 630, and 650, the total number of indicia 617 and 637, which is constructed of a plurality of dots indicative of location of the pages displayed on the current screen among the total pages of the respective devices 610, 630, and 650, may vary.

For example, if only one page is displayed on the screen of the device 610, six pages may be displayed sequentially in response to a user gesture (e.g., a flick gesture). In this example, the indicia 617 indicates that there are six displayable pages, and where the currently-displayed page is located among the six pages.

Further, where two pages are concurrently displayed on one screen of device 630, the six pages may be displayed in pairs, in sequence, and in response to three user gestures. In this example, the indicia 637 indicates that there are three groups of pages displayable and to which of the three groups the currently-displayed page group belongs.

Further, because the six pages are concurrently displayed on the screen of device 650, the indicia may be omitted. As described above, as the number of pages that can be displayed on one screen of the devices 610, 630, and 640 increases, the number of indicia displayed on the screens of the devices 610, 630, and 650 may decrease.

Referring again to FIG. 5, in step S503, the controller 380 determines a layout of the icons displayed on the screen of the first device 10.

Specifically, the controller 380 arranges a plurality of icons on the page of the first device 10 corresponding to the page of the second device 20, using the page information of the second device 20 and information about locations and sizes of the icons included in the page. For example, the controller 380 arranges a plurality of icons on the page of the first device 10 corresponding to the page of the second device 20, in the same or similar format as the locations and sizes of the icons included in the page of the second device 20.

Figure 7:
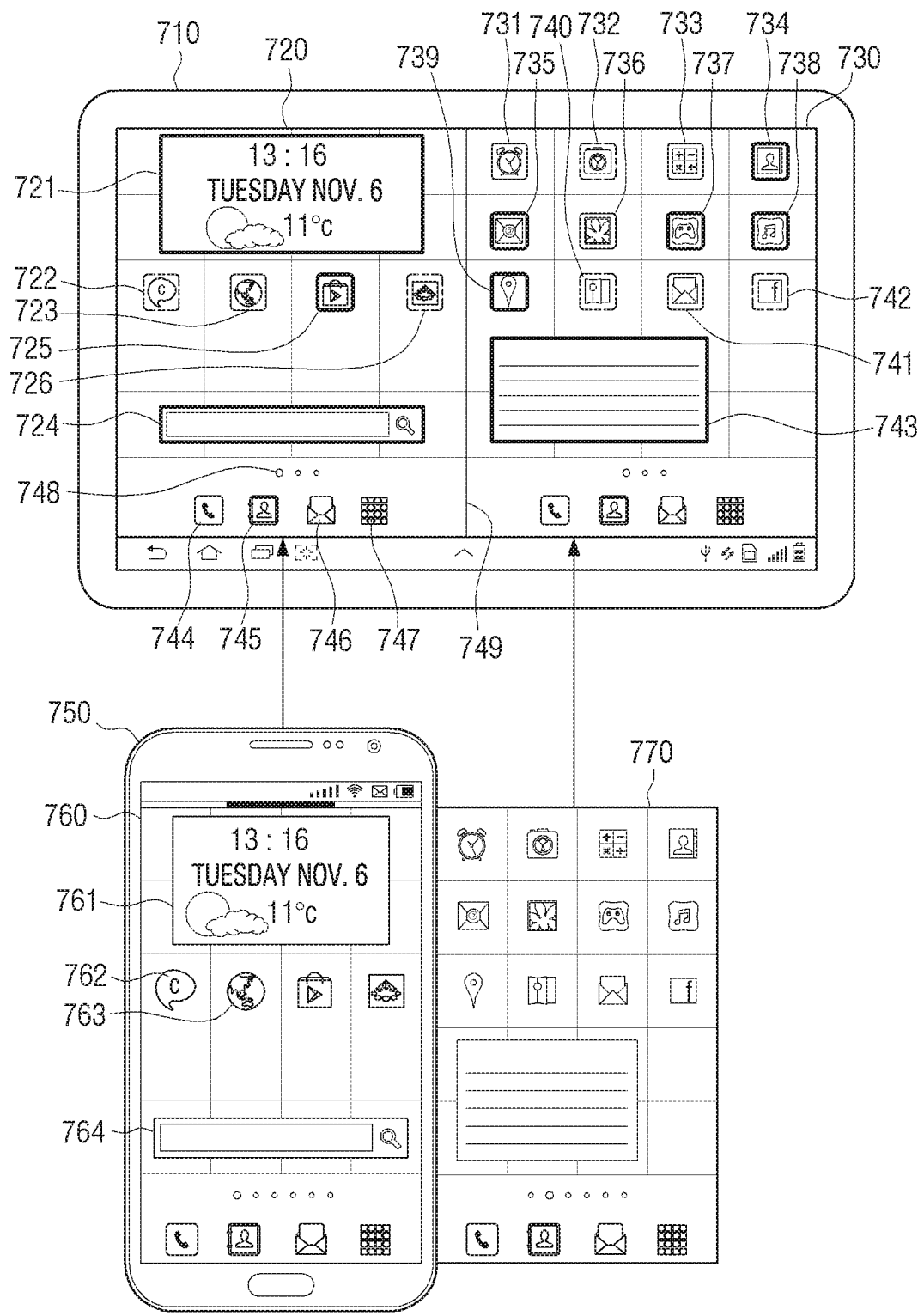
FIG. 7 illustrates screens on which an icon layout is shared among devices, according to an embodiment of the present invention.

FIG. 7 illustrates screens on which an icon layout is shared among devices, according to an embodiment of the present invention.

Referring to FIG. 7, a device 710 receives information about a layout of icons from a device 750. A first page 720 of the device 710 corresponds to a first page 760 of the device 750, and a second page 730 of the device 710 corresponds to a second page 770 of the device 750.

The device 710 receives information about the icon layout from the device 750 and displays a plurality of icons on the screen of the device 710. For example, the device 710 receives, from the device 750, information about a page where a weather widget icon 761 is placed, coordinates (1, 1) that represent the location in a cell area at which the icon 761 is arranged, and size 4×5 of the cell area where the icon 761 is displayed. Using this information, the device 710 determines the page where the weather widget icon 721 of the device 710 is located, the coordinates of a location of the icon arranged in a cell, and a size of the cell where the icon is displayed. For example, the device 710 may determine the left page on the screen to be the page where the weather widget icon 721 is located, determine (1, 1) on the left page to be the coordinates of the location of the cell where the icon is arranged, and determine 4×5 to be the size of the cell area on the left page where the icon is displayed.

Similarly, the device 710 may use the information about the layouts of the icons 762, 763, and 764 received from the device 750 to determine the page of the icons 722, 723, and 724 to be arranged on the screen of the device 710, coordinates of a location of the icon in the cell, and a size of the cell area where the icon is displayed.

The icons 744, 745, 746, and 747 that are displayed on the first and second pages 720 and 730 may be displayed on the first and second pages 720 and 730, respectively. Alternatively, the icons 744, 745, 746, and 747 may be displayed on either of the first or second pages 720 or 730, or some of the icons 744, 745, 746, and 747 may be displayed on the first page 720 and the rest of the icons 744, 745, 746, and 747 may be displayed on the second page 730, in which the first and second pages 720 and 730 are divided with reference to a center 749 therebetween.

Further, indicia 748, i.e., a plurality of dots that indicate the locations of the first and second pages 720 and 730, is displayed on both of the first and second pages 720 and 730. Alternatively, the indicia 748 may be displayed on either one of the first and second pages 720 and 730, or some of the indicia 748 may be displayed on the first page 720 and the rest of the indicia 749 may be displayed on the second page 730, in which the first and second pages 720 and 730 are divided with reference to the center 749 therebetween.

Referring again to FIG. 5, in step S504, the controller 380 checks the install status of applications that corresponds to the icons displayed on the screen of the first device 10. The controller 380 then varies the form of displaying the icons, depending on the install status of the application. For example, varying the displaying form of the icons may include entirely or partly varying color, lightness, or brightness of the icon, or varying the color, lightness or brightness of a cell including icon therein.

In step S505, the controller 380 determines if the application corresponding to the icon is installed on the first device 10. If the application corresponding to the icon is installed, the first device 10 displays the icon in the form of an installed icon in step S506.

However, if the application corresponding to the icon has not been installed, the first device 10 determines if the application is installable on the first device 10 in step S507.

If the application is installable on the first device 10 in step S507, the controller 380 displays the icon as an installable icon. When the icon is displayed as an installable icon, the user may request installation of the application corresponding to the icon, by making a suitable gesture to select the icon.

In step S509, the first device 10 installs the application corresponding to the icon, in response to the instruction by a user to install the application corresponding to the icon. Although not illustrated in FIG. 5, the first device 10 may change the icon corresponding to the application in the installed icon form and display it in step S506.

If the application corresponding to the icon is a non-installable icon in the first device 10 in step S507, the controller 380 displays the icon in the form of a non-installable icon in step S510.

According to an embodiment of the present invention, an application may be installed automatically by the first device 10 or a user.

When the application is installed automatically by the first device 10, some icons which are displayed on the screen of the first device 10 may be displayed in the installed icon form, while other icons may be displayed in icon forms that are not installed yet. On the contrary, if the user installs the application, the screen of the first device 10 may display some icons in the installable icon form, while display other icons in icon forms that are not installed yet And, if a user proceeds with installing an application installed in icon forms that are not installed yet, the application may be changed to icon forms with the installed applications and displayed.

The first device 10 may determine whether the specific application is installable or not, by determining whether the specific application is within an installable range or not. For example, the range for determining installability may include screen resolution of the application, an OS version of the first device 10, the supporting peripheral units, etc.

Referring again to FIG. 7, the icons of the device 710 may be displayed in different forms, depending on the install status of the applications corresponding to the icons. For example, icons 721, 724, and 725 on the first page 720 of the device 710 and icons 734, 735, 737, 738, 739, and 743 on the second page 730 are have corresponding applications installable on the device 710, and thus, have bold line edges to indicate installability on the device 710. Icon 723 on the first page 720 and icons 731, 733, 736, and 741 on the second page 730 of the device 710 correspond to applications that are installable on the first device 710, but have not been installed yet, and thus, have solid lines edges to indicate that the applications have not been installed yet. Icons 722 and 726 on the first page and icons 732, 740, and 742 on the second page of the device 710 correspond to applications that are not installable on the device 710, and thus, have dotted line edges or the icons may be translucently displayed to indicate that the corresponding applications are not installable.

In accordance with an embodiment of the invention, the controller 380 determines the number of pages displayed on the first device 10 and the size of the icons, depending on a user input made via a user interface. For example, the first device 10 provides the user with a menu to enter the number of pages displayed on one screen of the first device 10. According to the number of pages input by the user, the controller 380 determines the number of pages displayed on the screen of the first device 10 and the size of icons. For example, the first device 10 may provide the user with a menu to determine the size of icons. According to the size of the icon input by the user, the controller 380 determines the size of icons displayed on the screen of the first device 10 and subsequent number of pages. Additionally, the controller 380 may provide the layout of the plurality of icons to be displayed on the screen in the form of preview screen.

Figure 8:
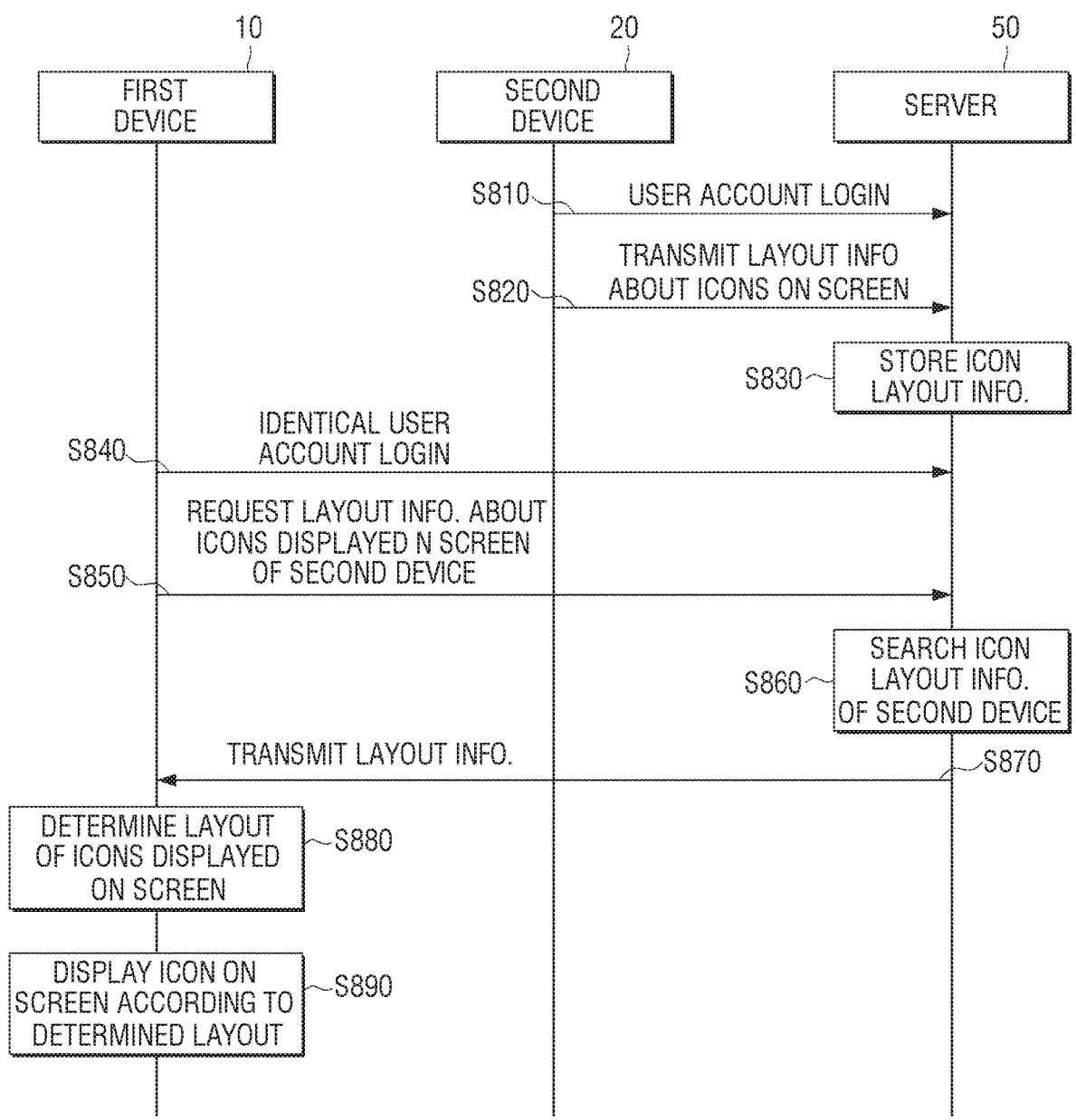
FIG. 8 is a signal flow diagram illustrating a method of sharing an icon layout among devices, according to an embodiment of the present invention.

FIG. 8 is a signal flow diagram illustrating a method of sharing an icon layout among devices, according to an embodiment of the present invention.

Referring to FIG. 8, in step S810, a user of the second device 20 logs in to the server 50 with a user account. In step S820, the second device 20 transmits the information about the layout of the icons on the screen of the second device 20, in response to a user request or automatically. In step S830, the server 50 stores the received information about the layout of the icons of the second device 20 in a storage of the server.

In step S840, the user uses the first device 10 to log in to the server 50 with the same user account as the second device 20. In step S850, the first device 10 requests information about a layout of the icons on the screens of the second device 20, in response to a user request or automatically.

In step S860, the server 50 searches the layout information of the icons of the second device 20 from the storage of the server 50, in response to the request from the first device 10. In step S870, the server 50 transmits, to the first device 10, the searched information about the layout of the icons of the second device 20.

In step S880, the first device 10 determines a layout of the icons displayed on the screen of the first device 10, using the information about the layout of the icons of the second device 20, as received from the server 50. In step S890, the first device 10 displays the icons on the screen of the first device 10 according to the determined layout.

Figure 9:
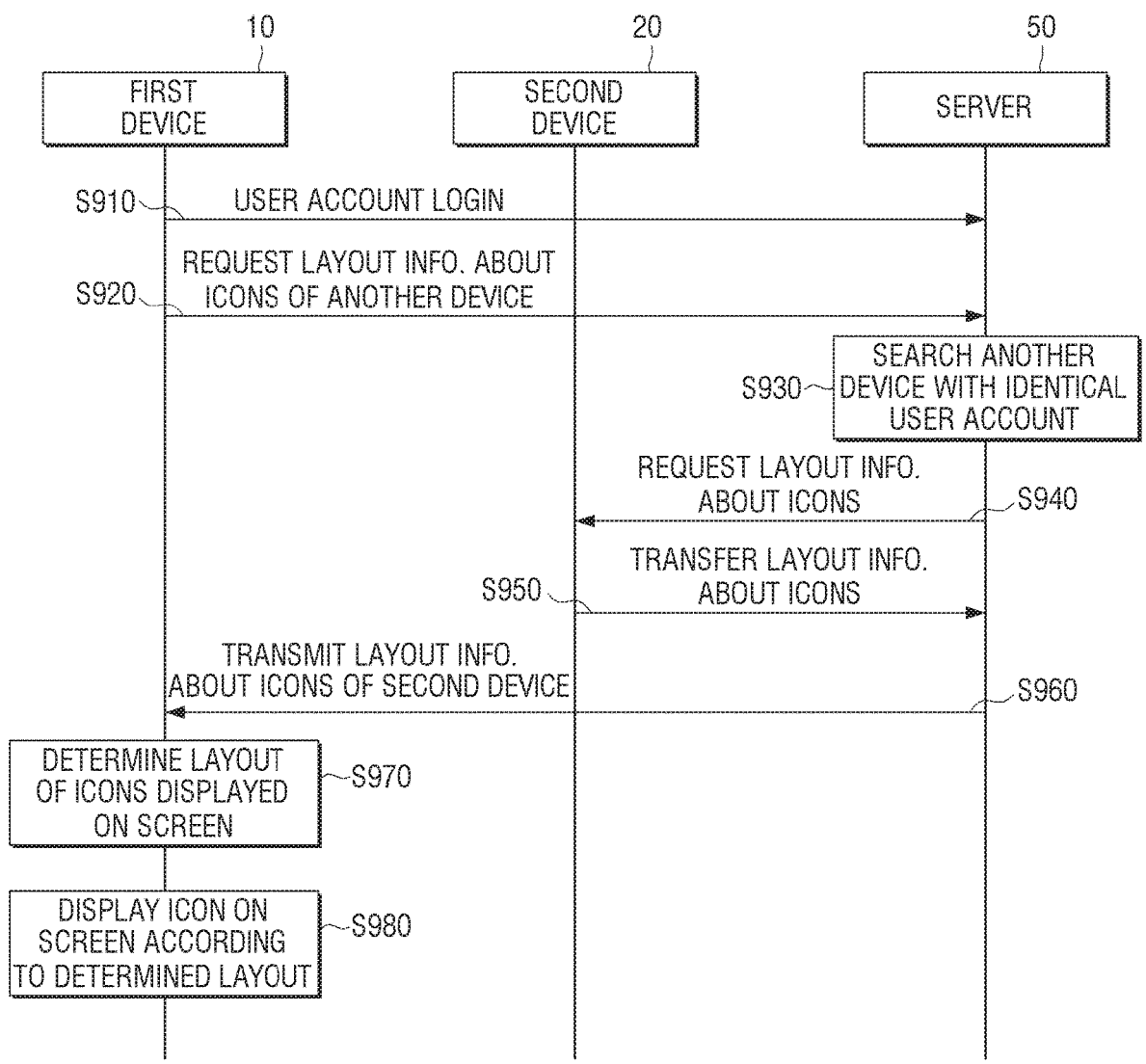
FIG. 9 is a signal flow diagram illustrating a method of sharing an icon layout among devices, according to an embodiment of the present invention.

FIG. 9 is a signal flow diagram illustrating a method of sharing an icon layout among devices, according to an embodiment of the present invention.

Referring to FIG. 9, in step S910, a user uses the first device 10 to log in to the server 50 based on the user account. In step S920, the first device 10 requests information about a layout of the icons on the screen of another device, in response to a user's request or automatically. In step S930, in response to the request from the first device 10, the server 50 searches for another device with the same user account from its own list of devices. Alternatively, the server 50 may search devices other than the another device of the same user account. That is, the server 50 may search devices of another user who is an acquainted person to the user or who belongs to a specific same group as the user. The server 50 may additionally provide a user signal requesting to select one from among the layouts of the plurality of icons that correspond to the plurality of devices, respectively.

In step S940, the server 50 requests information about the layout of the icons to the second device 20, which is either automatically searched by the server 50 or selected by the user. In step S950, the second device 20 transmits the information about the layout of the icons on the screen of the second device 20 to the server 50. In step S960, the server 50 transmits the information about layout of the icons on the screen of the second device 20, as received from the second device 20, to the first device 10.

In step S970, the first device 10 determines the layout of the icons displayed on the screen of the first device 10, using the information received from the server 50. In step S980, the first device 10 displays the icons on the screen of the first device 10 according to the determined layout.

Figure 10:
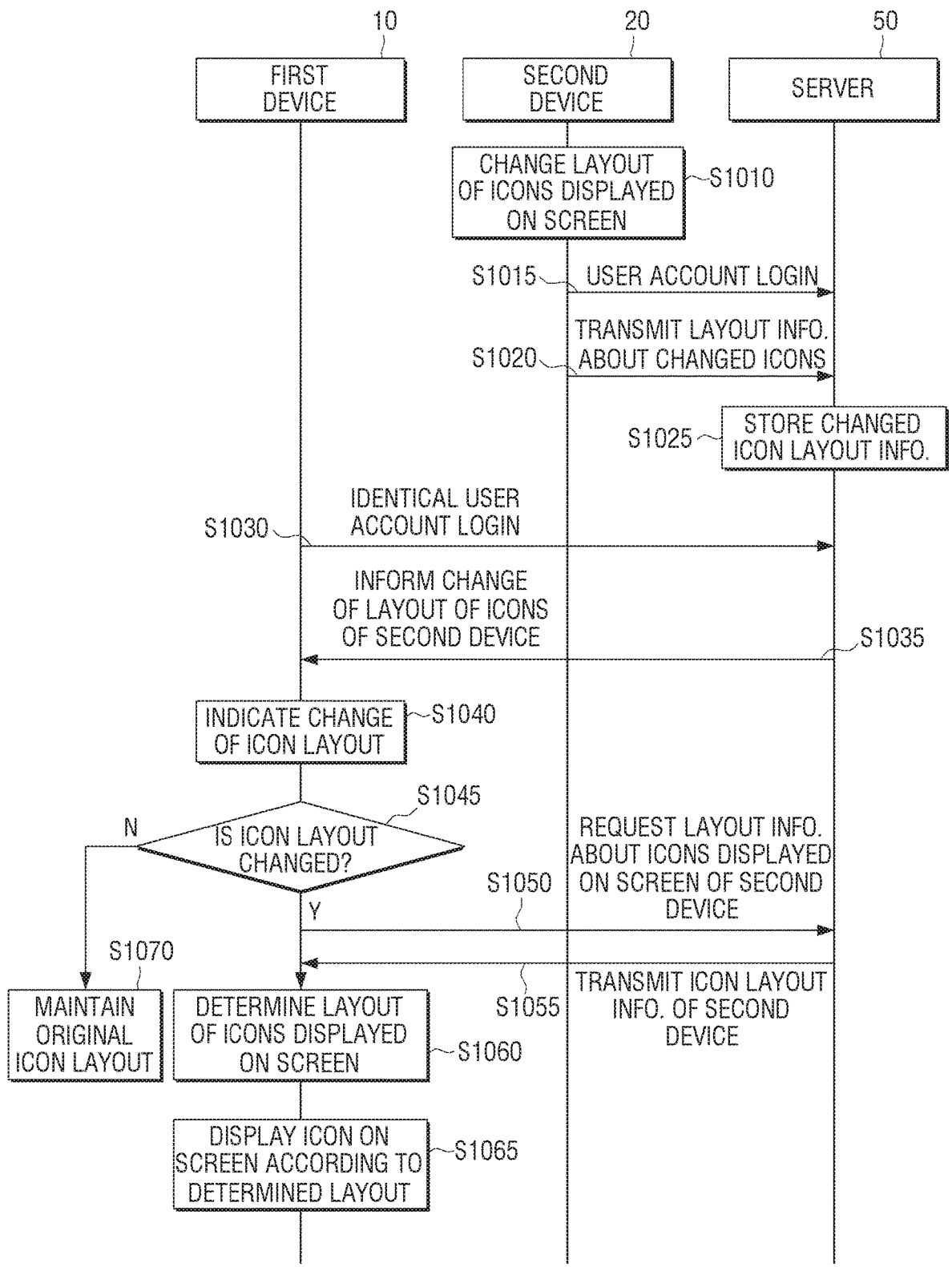
FIG. 10 is a signal flow diagram illustrating a method of sharing an icon layout among devices, according to an embodiment of the present invention.

FIG. 10 is a signal flow diagram illustrating a method of sharing an icon layout among devices, according to an embodiment of the present invention.

Referring to FIG. 10, in step S1010, the user changes the layout of the icons displayed on the screen of the second device 20. In step S1015, the user uses the second device 20 to log in to the server 50, based on the user account. In step S1020, the second device 20 transmits the changed information about layout of the icons of the second device 20 to the server 50, either in response to a user request or automatically. In step S1025, the server 50 stores the changed information about layout of the icons of the second device 20.

In step S1030, the user uses the first device 10 to log in to the server 50, based on the user account. In step S1035, the server 50 transmits, to the first device 10, information indicating that the icon layout of the second 20 is changed.

In step S1040, the first device 10 receives the information about the changed icon layout from the server 50 and indicates on the screen of the first device 10 that the layout of the icons of the second device 20 has changed. For example, the information may include a popup window on the screen of the first device 10, or a message indicated on a status bar of the first device 10.

In step S1045, the first device 10 determines if the user input in response to the message directs to change the layout of the icons on the screen of the first device 10. When the user does not agree to change the layout of the icons, the first device 10 maintains the original icon layout of the screen of the first device 10 in step S1070, without changing the icon layout. However, when the user agrees to change the icon layout, the first device 10 requests the layout information of the icons displayed on the screen of the second device 20 from the server 50 in step S1050.

In step S1055, in response to the request from the first device 10, the server 50 transmits the layout information of the icons of the second device 20 to the first device 10. In step S1060, the first device 10 determines the layout of the icons displayed on the screen of the first device 10, using the information about the layout of the icons of the second device 20 received from the server 50. In step S1065, the first device 10 displays the icons on the screen of the first device 10 according to the determined layout.

Alternatively, the first device 10 may receive the information about a layout of the icons of the second device 20 and change the layout of the icons of the first device 10, upon logging in to the server 50, i.e., without generating a separate related message.

Alternatively, the second device 10 may selectively provide a message to inform the change of layout of the icons of the second device 20, based on the history of changes to the icon layout. For example, the second device 20 may transmit the information about the layout of the icons to the first device 10, when the change of the icon layout of the second device 20 includes a deletion of icons from the screen due to an uninstall of corresponding application, or a generation of new icons on the screen due to the installation of new applications.

Figure 11:
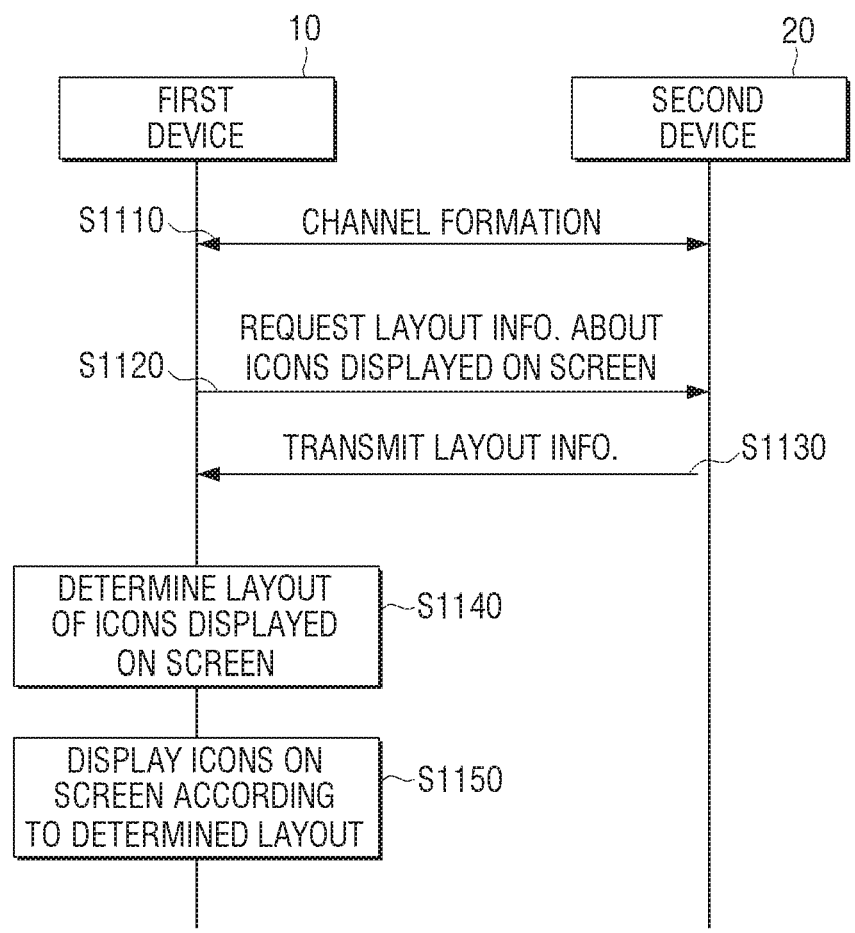
FIG. 11 is a signal flow diagram illustrating a method of sharing an icon layout among devices, according to an embodiment of the present invention.

FIG. 11 is a signal flow diagram illustrating a method of sharing an icon layout among devices, according to an embodiment of the present invention.

Referring to FIG. 11, in step S1110, a channel is formed between the first and second devices 10 and 20. For example, the channel may be formed using via a wireless internet connection or through short-range communication.

In step S1120, the first device 10 requests information about a layout of the icons currently displayed on a screen of the second device 20. In step S1130, the second device 20 transmits, to the first device 10, the information about the layout of the icons of the second device 20, in response to the request from the first device 10. In step S1140, using the received information about layout of the icons of the second device 20, the first device 10 determines the layout of the icons displayed on the screen of the first device 10. In step S1150, the first device 10 displays the icons on the screen thereof according to the determined layout.

Figure 12:
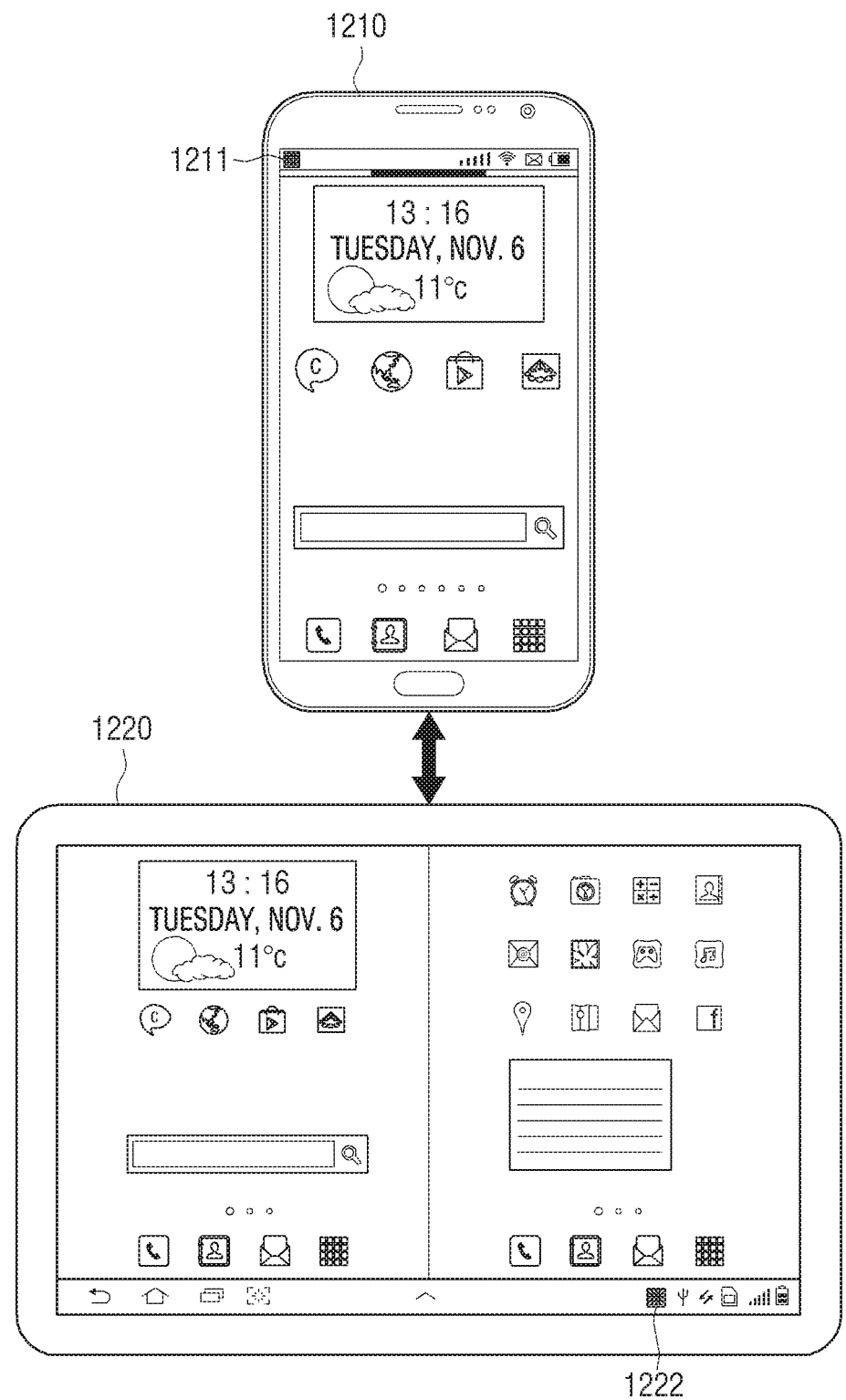
FIG. 12 illustrates screens that inform of a change in an icon layout among devices, according to an embodiment of the present invention.

FIG. 12 illustrates screens that inform of a change in an icon layout among devices, according to an embodiment of the present invention.

Referring to FIG. 12, when a layout of icons is changed on one of the screens of devices 1210 or 1220, the device transmits information to the counterpart device to inform that the layout of the icons on its own screen has changed. For example, the user may uninstall an application from one of the devices 1210 and 1220, install a new application, or move an icon to another screen. Thereafter, the information is transmitted from the device having a change in the icons on the screen to the other device, to inform that the layout of the icons has changed.

After receiving the information about the changed layout of the icons, devices 1210 and 1220 display a message 1211 and 1222, respectively, on the screens thereof. If the user requests to change the layout of the icons, the devices 1210 and 1220 displaying the message 1211 and 1222 display the layout of the icons on their screens in the same or similar layout as the icons of the original device.

Alternatively, when the layout of icons of a counterpart device is changed, a device may change an arrangement of icons on its own screen using the information about the layout of icons of the counterpart device. Thereafter, the device may provide a message to inform that the arrangement of icons on the screen is changed.

In accordance with the above-described embodiments of the present invention, user inconvenience is improved, particularly when a user changes his device or purchases an additional device, e.g., a tablet device. For example, when a user tries to execute a changed device or newly-purchased device for the first time, conventionally, the user first obtains applications to be installed on the new device by search in an application market and then changes the locations of the icons corresponding to the applications.

According to the above-described embodiments, however, when a user changes devices or newly-purchases a device, the device automatically installs the applications installed on the previously owned devices, and then automatically arranges the locations of the icons corresponding to the applications in the same or at least a similar fashion as in the previously owned devices. Further, when the user later uses the previously owned and new devices at the same time, because a change in the layout of the icons of the previously owned or new device is informed to the counterpart device, the layout of the icons can be maintained among the devices.

Additionally, the above-described embodiments may be implemented using hardware or a combination of hardware and software. The predetermined software may be stored on, irrespective of whether this is deletable or re-writable, volatile or non-volatile storage, such as a ROM, or a storage such as, for example, a RAM, a memory chip, device or integrated circuit, or a storage medium which is optically- or magnetically-writable and also readable by a machine (e.g., computer), such as a CD, DVD, magnetic disk or magnetic tape.

A device for displaying a plurality of icons on a screen and a method for operating the same according to an embodiment of the present invention may be implemented by a computer or portable terminal including a controller and a storage, in which the storage includes a program including instructions to implement embodiments or a machine-readable storage medium which stores the programs. Accordingly, further included are a program including codes to implement an apparatus or a method as explained herein or covered in the accompanying claims and a machine (e.g., computer)-readable storage medium which stores such program therein. Further, such program may be electrically conveyed via a predetermined medium such as a communication signal which is transmitted by wired or wireless connection, or any appropriate equivalents thereof. Further, according to various embodiments, the programs may be received from a wired or wirelessly-connected program provider and stored. Furthermore, a user may adjust the setting of the user device to limit the operation according to various embodiments to the user terminal only, or selectively extend the operation to the operation performed in association with the server via the network.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for an electronic device including a processor, communication circuitry and a display configured to provide a first screen, the method comprising:

based on receiving a first user input for selecting an external device among a plurality of external devices, receiving, via the communication circuitry, screen layout information about a layout of visual display elements for a second screen displayed by selected external device, the screen layout information comprising page information regarding a plurality of pages for the second screen of the selected external device, information of arrangement of the visual display elements included in the plurality of pages for the second screen of the selected external device, and application information for identifying applications installed on the selected external device corresponding to the visual display elements;
based on a second user input for selecting a number of pages to be simultaneously displayed on the first screen among the plurality of pages, displaying, on the first screen including at least one page according to the selected number of pages, the visual display elements included in the at least one page corresponding to the arrangement of the visual display elements for the second screen based on the information of arrangement,
wherein the visual display elements displayed on the first screen includes one of a first displaying form, a second displaying form and a third displaying form, and
wherein the first displaying form based on the application being installed on the electronic device, the second displaying form being different from the first displaying form and based on the application being installable, but not installed, on the electronic device, and the third displaying form being different from the first displaying form and the second displaying form and based on the application being uninstallable on the electronic device.

2. The method of claim 1, wherein the screen layout information is received from the selected external device or from a server.

3. The method of claim 1, wherein the screen layout information comprises at least one of:
the size of the second screen of the selected external device;
a resolution of the second screen of the selected external device;
a Pixel Per Inch (PPI) of the second screen of the selected external device;
information about a page where the visual display elements are located;
identification information of applications corresponding to the visual display elements;
visual display element type information;
visual display element location information;
visual display element display size information;
widget identification information; and
information about order of the visual display elements.

4. The method of claim 1, wherein the displaying of the visual display elements comprises displaying visual display elements corresponding to applications that are installable on the electronic device distinctively from visual display elements corresponding to applications that are not installable on the electronic device.

5. The method of claim 1, further comprising displaying an indication on the first screen about a change in the screen layout information of the visual display elements for the second screen, when the screen layout information changes.

6. An electronic device comprising:
a display;
communication circuitry; and
a processor configured to:
based on receiving a first user input for selecting an external device among a plurality of external devices, receive, via the communication circuitry, screen layout information about a layout of visual display elements for a second screen displayed by selected external device, the screen layout information comprising page information regarding a plurality of pages for the second screen of the selected external device, information of arrangement of the visual display elements included in the plurality of pages for the second screen of the selected external device, and application information for identifying applications installed on the selected external device corresponding to the visual display elements;
based on a second user input for selecting a number of pages to be simultaneously displayed on the first screen among the plurality of pages, display, on the first screen including at least one page according to the selected number of pages, the visual display elements included in the at least one page corresponding to the arrangement of the visual display elements for the second screen based on the information of arrangement,
wherein the visual display elements displayed on the first screen includes one of a first displaying form, a second displaying form and a third displaying form, and
wherein the first displaying form based on the application being installed on the electronic device, the second displaying form being different from the first displaying form and based on the application being installable, but not installed, on the electronic device, and the third displaying form being different from the first displaying form and the second displaying form and based on the application being uninstallable on the electronic device.

7. The electronic device of claim 6, wherein the screen layout information is received from the selected external device or from a server.

8. The electronic device of claim 6, wherein the screen layout information comprises at least one of:
the size of the second screen of the selected external device;
a resolution of the second screen of the selected external device;
a Pixel Per Inch (PPI) of the second screen of the selected external device;
information about a page where the visual display elements are located;
identification information of applications corresponding to the visual display elements;
visual display element type information;
visual display element location information;
visual display element display size information;
widget identification information; and
information about order of the visual display elements.

9. The electronic device of claim 6, wherein the processor is further configured to display visual display elements corresponding to applications that are installable on the electronic device distinctively from visual display elements corresponding to applications that are not installable on the electronic device.

10. The electronic device of claim 6, wherein the processor is further configured to display an indication on the first screen about a change in the screen layout information of the visual display elements for the second screen, when the screen layout information changes.

11. A non-transitory computer-readable medium storing a program which, when executed by a processor of an electronic device including communication circuitry and a display configured to provide a first screen, cause the processor to control the electronic device to perform operations comprising:

based on receiving a first user input for selecting an external device among a plurality of external devices, receiving, via the communication circuitry, screen layout information about a layout of visual display elements for a second screen displayed by selected external device, the screen layout information comprising page information regarding a plurality of pages for the second screen of the selected external device, information of arrangement of the visual display elements included in the plurality of pages for the second screen of the selected external device, and application information for identifying applications installed on the selected external device corresponding to the visual display elements;

based on a second user input for selecting a number of pages to be simultaneously displayed on the first screen among the plurality of pages, displaying, on the first screen including at least one page according to the selected number of pages, the visual display elements included in the at least one page corresponding to the arrangement of the visual display elements for the second screen based on the information of arrangement, wherein the visual display elements displayed on the first screen includes one of a first displaying form, a second displaying form and a third displaying form, and wherein the first displaying form based on the application being installed on the electronic device, the second displaying form being different from the first displaying form and based on the application being installable, but not installed, on the electronic device, and the third displaying form being different from the first displaying form and the second displaying form and based on the application being uninstallable on the electronic device.

12. The non-transitory computer-readable medium of claim 11, wherein the screen layout information is received from the selected external device or from a server.

13. The non-transitory computer-readable medium of claim 11, wherein the screen layout information comprises at least one of:
  the size of the second screen of the selected external device;
  a resolution of the second screen of the selected external device;
  a Pixel Per Inch (PPI) of the second screen of the selected external device;
  information about a page where the visual display elements are located;
  identification information of applications corresponding to the visual display elements;
  visual display element type information;
  visual display element location information;
  visual display element display size information;
  widget identification information; and
  information about order of the visual display elements.

14. The non-transitory computer-readable medium of claim 11, wherein the displaying of the visual display elements comprises displaying visual display elements corresponding to applications that are installable on the electronic device distinctively from visual display elements corresponding to applications that are not installable on the electronic device.

15. The non-transitory computer-readable medium of claim 11, the method further comprising displaying an indication on the first screen about a change in the screen layout information of the visual display elements for the second screen, when the screen layout information changes.

* * * * *